Feb. 28, 1933.  J. KAISER  1,899,199
ELECTRICAL RAT EXTERMINATOR
Filed Sept. 4, 1931  2 Sheets-Sheet 1
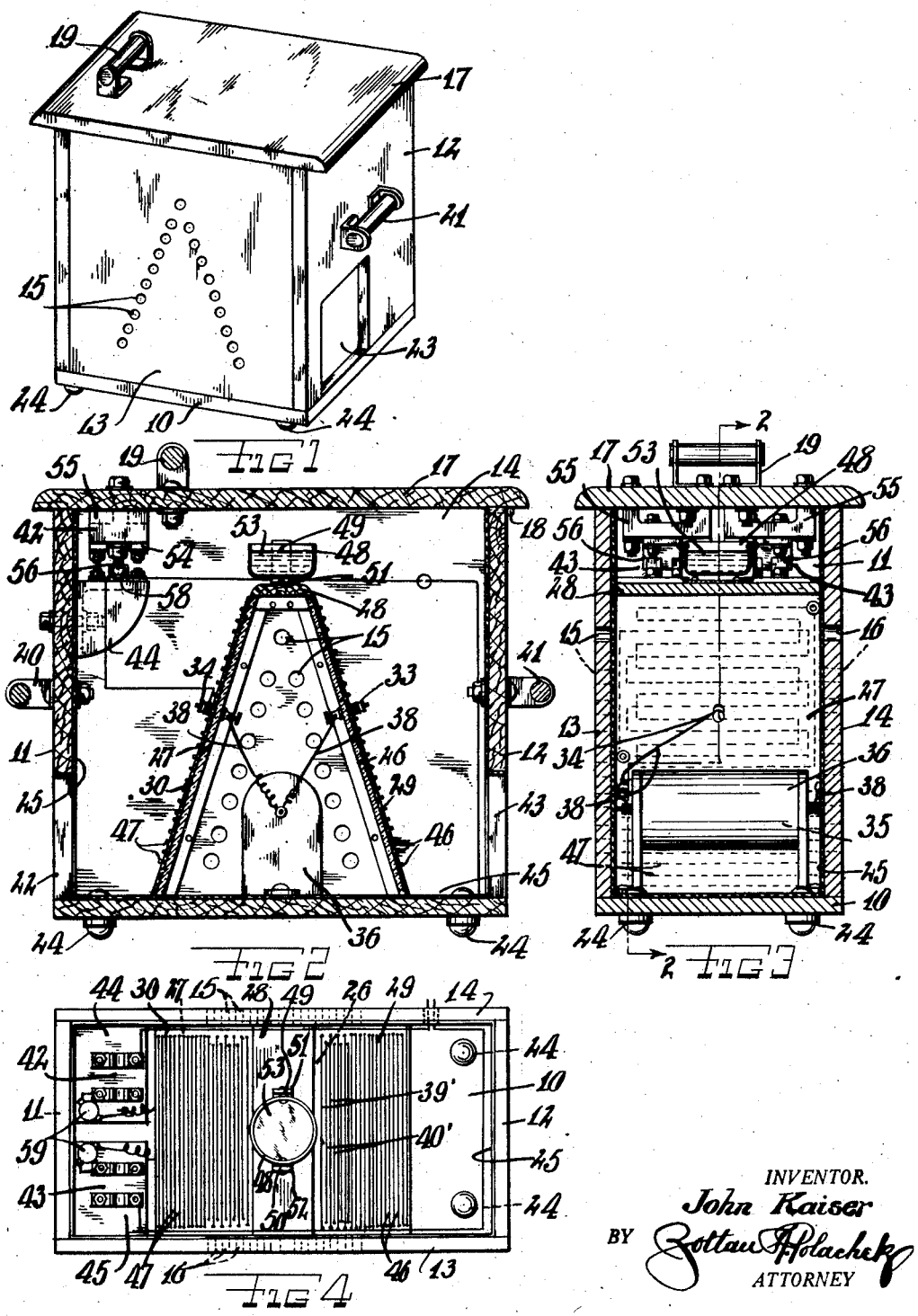
INVENTOR.
John Kaiser
BY
ATTORNEY

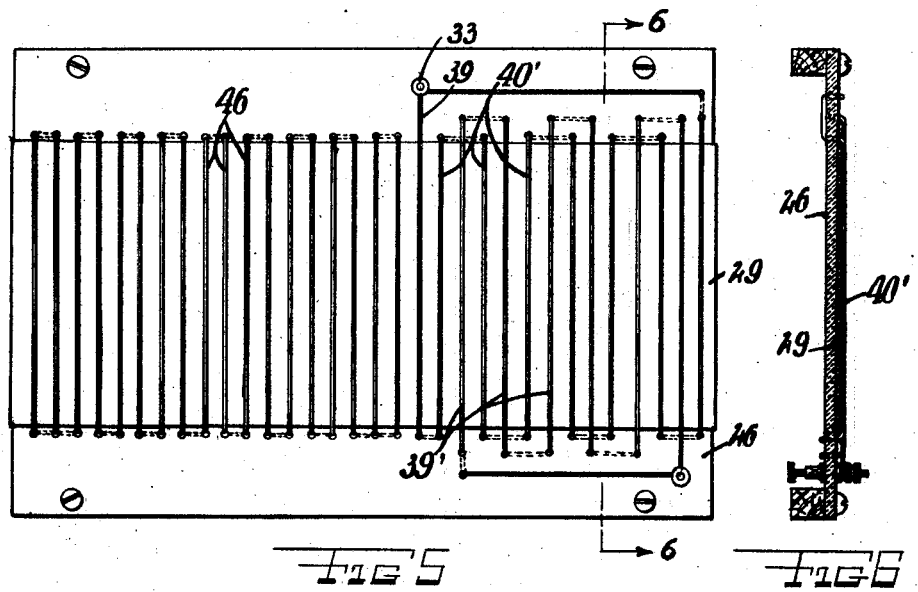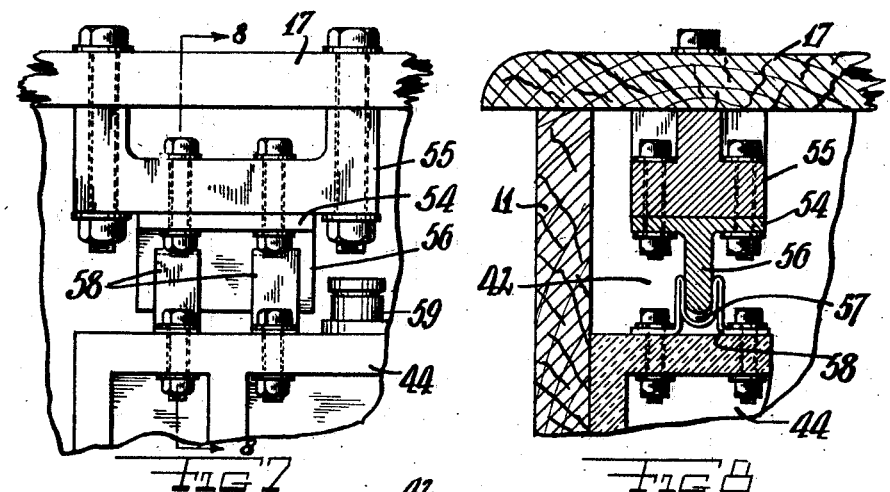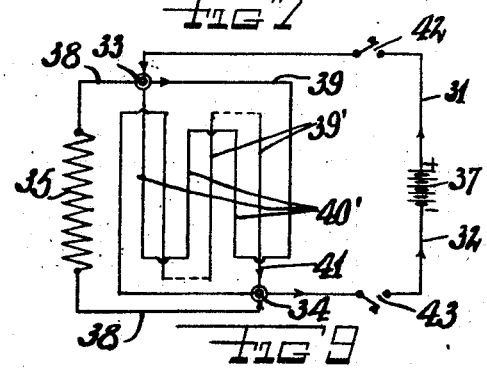

Patented Feb. 28, 1933

1,899,199

UNITED STATES PATENT OFFICE

JOHN KAISER, OF DOBSINA, CZECHOSLOVAKIA

ELECTRICAL RAT EXTERMINATOR

Application filed September 4, 1931. Serial No. 561,117.

This invention relates to a new and useful device in the nature of a rat exterminator especially adapted for the purpose of killing rats on board ship.

The object of the invention is to provide a device of box-like construction having an opening formed therein to permit the rats to enter my improved device, and having contained therein a pair of angularly inclined grids comprising a primary and secondary wiring suitably charged by electricity for the purpose of electrocuting the rats, a container adapted to hold oil, for the purpose of enticing the rats to climb up the said angularly inclined grids. The said device having a top hinged thereto, which is left open for a day or two permitting the rats to freely enter and leave my improved device so as to become accustomed to and not afraid of same. The electrical connection from any suitable source of current to the grids contained in my improved device is made through a suitable switch secured to the top cover for the purpose of disconnecting the current to the grids when the top cover is left open.

A further object of the invention is to provide a device of the class described of novel construction and arrangement of parts hereinafter more fully described, claimed and illustrated in the accompanying drawings.

Fig. 1 is a perspective view of my improved device.

Fig. 2 is an enlarged longitudinal vertical central sectional view thereof.

Fig. 3 is a similar transverse central sectional view thereof.

Fig. 4 is a top plan view thereof showing the top cover removed therefrom.

Fig. 5 is a detail top plan view of one of the grids as embodied in my improved device.

Fig. 6 is a transverse sectional view taken on the line 6—6 of Fig. 5.

Fig. 7 is a detail side elevational view of the top cover switch as embodied in my improved device.

Fig. 8 is a transverse vertical sectional view taken on the line 8—8 of Fig. 7.

Fig. 9 is a schematic wiring diagram of my improved device.

As here embodied my improved device comprises a box-like structure consisting of a base 10, end members 11 and 12 and side members 13 and 14. These side members 13 and 14 extend a comparatively short distance from the base 10, a plurality of apertures 15 and 16 located in the side members 13 and 14, so as to provide intermediate openings so as to permit the rats to readily smell the oil placed in a receptacle provided within my improved device for the purpose of enticing the rats. A top cover 17 adapted to enclose or cover the top portion of the said box-like structure is hinged as at 18 in the usual well known manner to the upper edge of the end member 12. Suitable handles 19, 20 and 21 are secured respectively to the top cover 17 and to the end members 11 and 12, to facilitate the opening and closing of the top cover 17 and the transportation of my improved device. Suitable openings 22 and 23 are formed respectively in the end members 11 and 12 in proximity to the base 10 for the purpose of permitting the rats to readily enter my improved device. Supports 24 are secured to the base 10 and extend downwardly therefrom and serve as feet or supports for my improved device. The inner sufaces of the above mentioned box-like structure is covered by a suitable insulation material 25 so as to provide the desired preventative measure from electrical shocks due to the high voltage carried in the grids.

A pair of grids 26 and 27 of rectangular plate-like construction are positioned in the above mentioned box-like structure and are angularly upwardly inclined from the base 10. These grids 26 and 27 are constructed of any suitable insulation material preferably glass and are of suitable width to extend intermediate the side members 13 and 14 and the apertures 15 and 16 and are secured thereto. A top 28 is secured to the upper extended edges of the grids 26 and 27 and is adapted to enclose or cover the grids at the latter mentioned portion thereof. The outer surfaces of the grids 26 and 27 are covered with asbestos sheeting 29 and 30 or the like for the purpose of providing a footing for the rats so as to permit the rats to readily climb up the grids.

Any suitable convenient source 37 of electric current of sufficient voltage has connected thereto suitable wires 31 and 32 extended therefrom and connected by binding posts 33 and 34 mounted on the grids 26 and 27 in proximity to the central portion thereof. A resistance coil 35 positioned in a suitable casing 36 is secured to the base 10 and is positioned under the grids 26 and 27. Suitable wires 38 are connected to the resistance coil 35 and to the above mentioned binding posts 32 and 34. A wire 39 preferably of soft copper is connected to the binding post 33 and is extended therefrom through apertures formed in the grids 26 and 27 at the sides thereof so as to provide a plurality of transverse portions 40' extending relatively upwardly from the binding post 33 in proximity to the upper edge of the grids. This wire 39 is then extended downwardly and secured to the binding post 33. A wire 41 similar to the above mentioned wire 39 is secured to the binding post 34 and is similarly extended over the grids 26 and 27 so as to provide portions 39' similar to the above mentioned portions 40' of the wire 39. The wire 41 is then extended and is secured to the binding post 34. Suitable switches 42 and 43 are interposed in the wires 31 and 32 respectively. These switches 42 and 43 are of special construction as hereinafter set forth and described and are mounted on the top cover 17 and on brackets 44 and 45 secured to the end member 11.

The latter described construction is such as will electrocute, so as to cause instantaneous humane death to the rats climbing up the grids 26 and 27 when stepping on the portions 39' and 40' of the wires 39 and 41.

Wires 46 and 47 preferably of steel are extended over the grids 26 and 27 so as to provide a plurality of transverse portions, and extend in proximity to the binding post 34 downwardly in proximity to the base 10. The latter described construction is such as will permit the rats to climb up the lower portion of the grids 26 and 27 after entering my improved device through the openings 22 and 23 so as to reach the hereinbefore described portions 39' and 40' of the wires 39 and 41.

A container 48 of bowl-like construction is pivotally mounted on trunnions 49 and 50 pivotally carried in the brackets 51 and 52 secured to and extended upwardly from the top 28. This container 48 is adapted to hold oil 53 which entices the rats at a comparatively long distance due to the odor of the said oil and which causes the rats to enter my improved device and climb up the grids 26 and 27 in an attempt to secure the oil 53.

The above mentioned switches 42 and 43 comprise an engaging member 54 secured to the lower portion of the bracket 55 secured to the inner portion on the top cover 17 in proximity to the end member 11. This engaging member 54 is provided with a longitudinally downwardly extended element 56. This element 56 is adapted to frictionally engage in openings 57 formed by bending the clips 58 so as to provide a U shape opening adapted to receive the said element 56 when the top cover 18 is closed. The clips 58 are secured to the above mentioned brackets 45 and to the bracket 44, secured to the end member 11. It is understood that the hereinbefore mentioned wires 31 and 32 are connected to the engaging member 54 and to the clips 58.

It is further understood that any desired suitable electrical devices such as fuses 59 and conventional knife switches as may be desired are provided for the purpose of providing suitable safety appliances due to the high voltage carried in the wires of my improved device.

Having thus described my invention, what I claim as new, and desire to protect by Letters Patent of the United States is as follows:—

1. In a device of the class described, a box-like structure having a top cover hinged thereto, openings formed in the said structure so as to permit rats to enter therein, a pair of grids secured to the base of the said structure and angularly upwardly inclined therefrom, a top secured to the said upper extended edges of the said grids, a container pivotally mounted on brackets secured to and extended from the said top, said container adapted to hold oil for the purpose of enticing the said rats, wires transversely arranged across the entire length of the grids, and a charge of electricity applied to the wires upon the upper portion of the grids.

2. In combination with a device of the class described, a box-like structure having a top cover hinged thereto, openings formed in the said structure so as to permit rats to enter therein, a pair of grids secured to the base of the said structure and angularly upwardly inclined therefrom, a top secured to the said upper extended edges of the said grids, a container pivotally mounted on brackets secured to and extended from the said top, said container adapted to hold oil for the purpose of enticing the said rats, wires on the upper portion of the grids charged with an electric current adapted to electrocute the rats climbing upon them, and means upon the rear portion of the grids facilitating the rats' journey to the charged wires.

3. In a device of the class described, a box-like structure having a top cover hinged thereto, openings formed in the said structure so as to permit rats to enter therein, a pair of grids secured to the base of the said structure and angularly upwardly inclined therefrom, a top secured to the said upper extended edges of the said grids, a container pivotally mounted on brackets secured to and extended from the said top, said container adapted to hold oil for the purpose of enticing the said rats, a wire and a second wire secured to the said grids and transversely disposed thereon, said wires extending from the said base in proximity to the central portion of the said grids so as to permit rats to climb up the said grids, an additional wire and a second wire similarly mounted on the said grids in proximity to the central portion of the said grids and extended in proximity to the upper extended edges thereof, said additional wires charged with an electrical current adapted to electrocute the rats climbing up the said additional wires in an attempt to reach the said oil.

4. In a device of the class described, a box-like structure having a top cover hinged thereto, openings formed in the said structure so as to permit rats to enter therein, a pair of grids secured to the base of the said structure and angularly upwardly inclined therefrom, a top secured to the said upper extended edges of the said grids, a container pivotally mounted on brackets secured to and extended from the said top, said container adapted to hold oil for the purpose of enticing the said rats, a wire and a second wire secured to the said grids and transversely disposed thereon, said wires extending from the said base in proximity to the central portion of the said grids so as to permit rats to climb up the said grids, an additional wire and a second wire similarly mounted on the said grids in proximity to the central portion of the said grids and extended in proximity to the upper extended edges thereof, said additional wires charged with an electrical current adapted to electrocute the rats climbing up the said additional wires in an attempt to reach the said oil, said additional wires connected to a switch and a second switch secured to the top cover of the said box-like structure and to the said structure as a means of breaking the circuit to the said additional wires when the said top cover is open, so as to permit rats to enter the said structure when the said top cover is open so as to permit the rats to freely enter and leave the said structure and thereby become familiar therewith.

In testimony whereof I have affixed my signature.

JOHN KAISER.